No. 657,437. Patented Sept. 4, 1900.
J. D. MORLEY.
FOCUSING CAMERA.
(Application filed May 16, 1900.)

(No Model.) 2 Sheets—Sheet 1.

Witnesses
F. E. Bechtold
Frank H. Graham

Inventor
Joseph D. Morley
by his Attorneys
Howson & Howson

THE NORRIS PETERS CO., PHOTO-LITHO., WASHINGTON, D. C.

No. 657,437.  
J. D. MORLEY.  
FOCUSING CAMERA.  
(Application filed May 16, 1900.)

Patented Sept. 4, 1900.

(No Model.)

2 Sheets—Sheet 2.

Witnesses  
F. E. Bechtold  
Frank H. Graham

Inventor  
Joseph D. Morley  
by his Attorneys

UNITED STATES PATENT OFFICE.

JOSEPH D. MORLEY, OF LAKE PLEASANT, NEW YORK.

FOCUSING-CAMERA.

SPECIFICATION forming part of Letters Patent No. 657,437, dated September 4, 1900.

Application filed May 16, 1900. Serial No. 16,871. (No model.)

*To all whom it may concern:*

Be it known that I, JOSEPH D. MORLEY, a citizen of the United States, and a resident of Lake Pleasant, Hamilton county, New York, have invented certain Improvements in Focusing-Cameras, of which the following is a specification.

The object of my invention is to provide a closed box-camera with means whereby the accurate focusing of the image may be effected without any exposure to light of the sensitive film or plate within the camera. This object I attain in the manner hereinafter set forth, reference being had to the accompanying drawings, in which—

Figure 1:
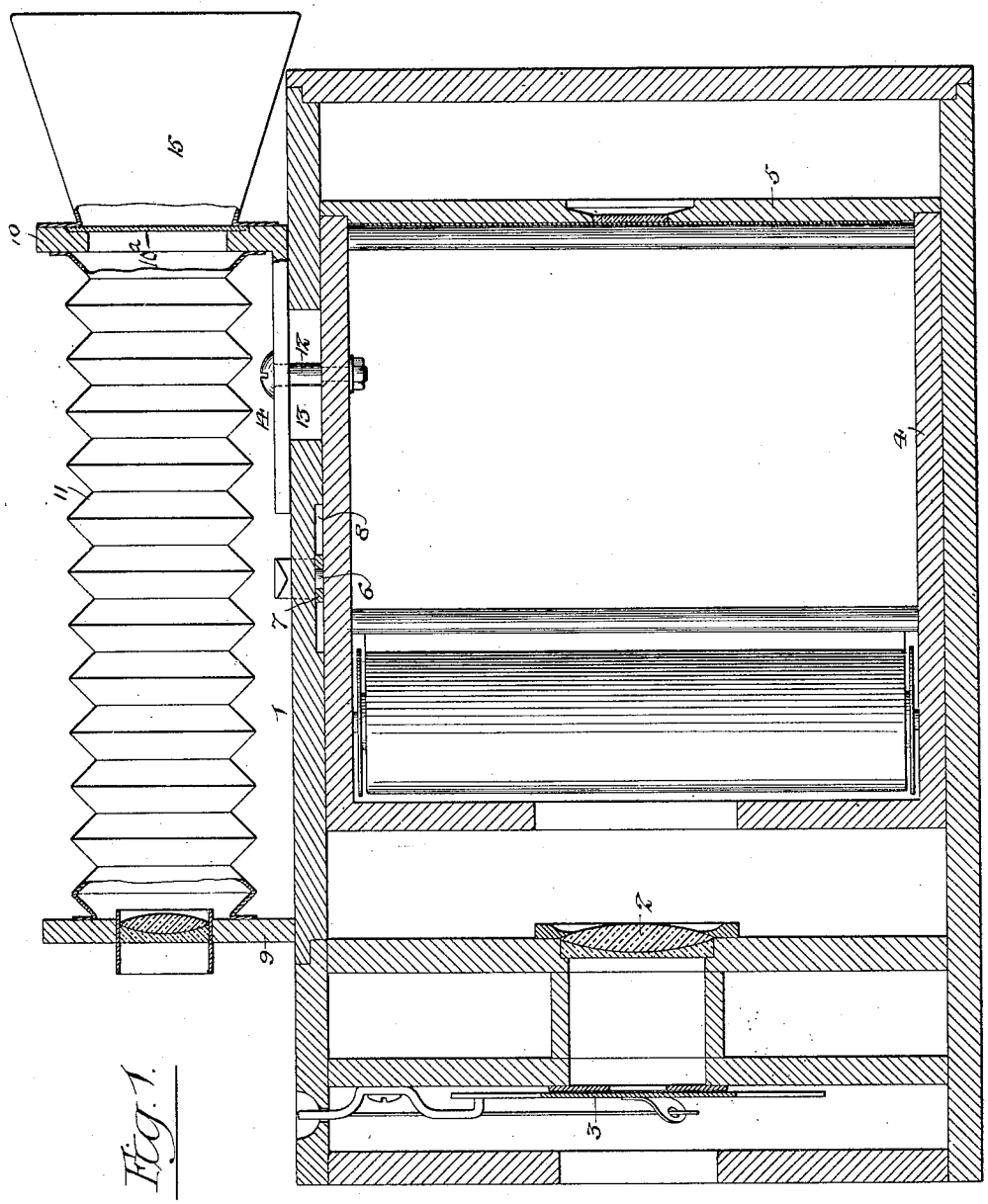
Figure 2:
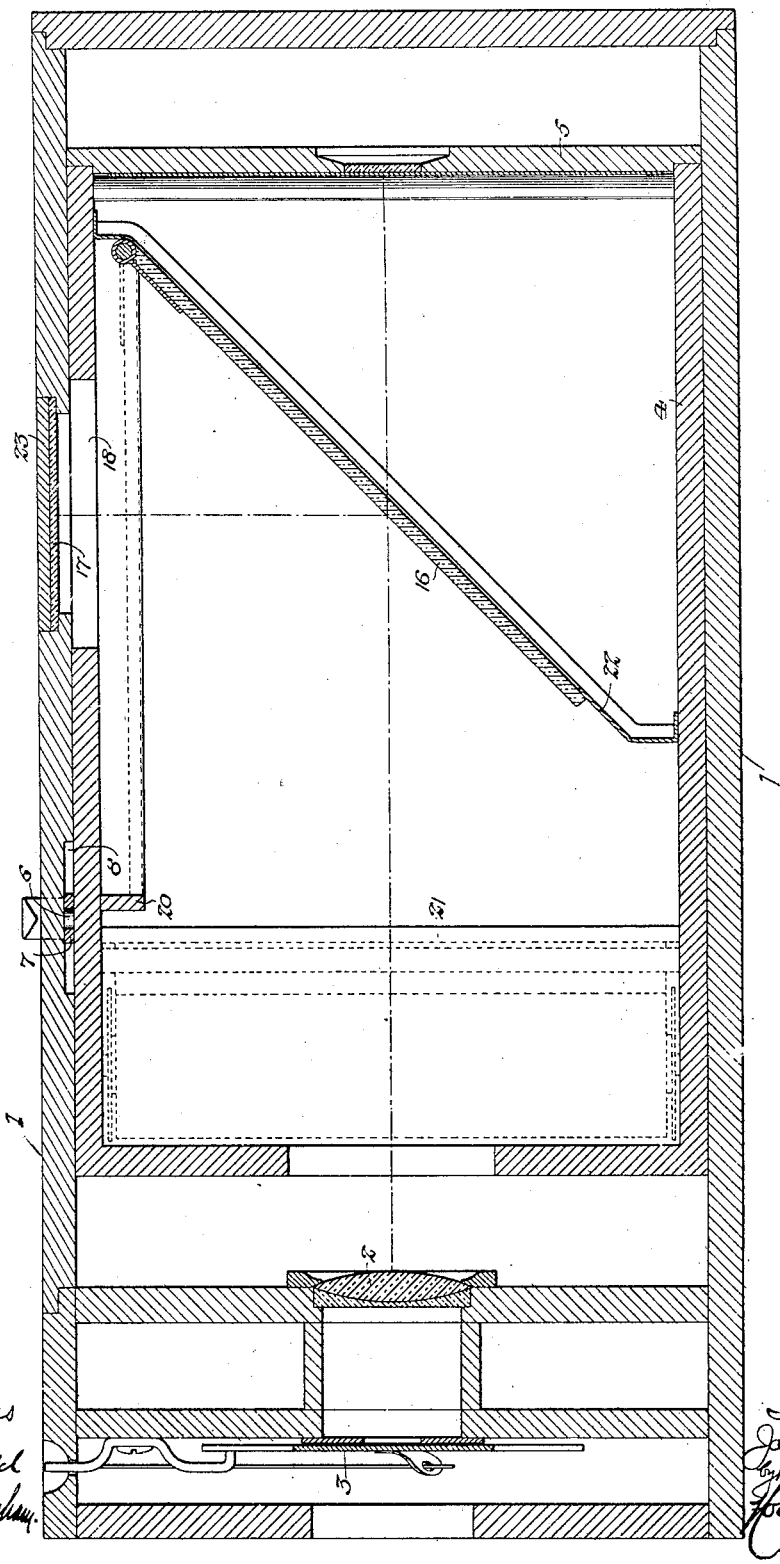

Figure 1 is a longitudinal sectional view of a closed box-camera, illustrating one means of carrying my invention into effect; and Fig. 2 is a similar view illustrating another embodiment of the invention.

The great objection to ordinary closed box-cameras, such as those using rolls of sensitive film or internal plate-holders, is the lack of any provision for accurate focusing of the image, the usual adjusting-lever, with pointer and scale of distances on the outside of the camera, being but a crude and unsatisfactory makeshift. My invention, therefore, has for its object the provision of a closed box-camera with means whereby the focusing of the image can be effected as accurately as with an ordinary open box-camera having a focusing-glass at the rear end.

In the drawings, 1 represents the outer casing of the camera; 2, the lens; 3, the shutter mechanism, and 4 the longitudinally-adjustable internal structure carrying the film rolls and guides, whereby the film is exposed in contact with the rear portion 5 of said adjustable structure. This structure may be adjusted in any desired manner—as, for instance, by engagement of a pin 6 thereon with the indicator-lever 7, which is hung to the outer box 1 and plays in a slot or recess 8 therein, this being a commonly-used means of adjustment.

One method of carrying out my invention is to mount upon the outer box 1 a lens-carrier 9, having a lens of the same focus as the lens 2 of the camera, and to connect to the adjustable structure 4 of the camera a focusing-plate carrier 10, whereby the focusing-plate $10^a$ will be at the same distance from the lens in the carrier 9 as is the exposed portion of the plate or film from the lens 2. Hence any adjustment of said focusing-plate toward or from the lens of the focusing device will be attended by a like movement of the exposed portion of the film or plate from or toward the lens of the camera, whereby a correct focusing of the image upon the focusing-plate will insure an equally-correct focusing of the image thrown by the lens 2 upon the exposed surface of the sensitive film or plate within the camera.

The lens-carrier 9 and focusing-plate carrier 10 may be connected together by any suitable form of telescopic connection, that shown in the drawings being the usual bellows connection 11, and a simple method of connecting the focusing-plate carrier 10 to the longitudinally-adjustable internal structure 4 of the camera is by means of a stud-bolt 12, secured to said structure 4, passing through a longitudinal slot 13 in the box 1 and connected to the base portion 14 of the focusing-plate holder 10, which portion 14 covers the slot 13 in all adjustments of the focusing device, and thus prevents any leakage of light into the interior of the camera through said slot. The focusing device may be provided with a hood 15 to facilitate the examination of the image formed upon the focusing-plate.

When it is not desired to use an external focusing device, I adopt the construction shown in Fig. 2, on reference to which it will be observed that the longitudinally-adjustable structure 4 of the camera has within the same a pivoted mirror 16, so mounted within the said structure 4 that when adjusted to the inclined position shown it will reflect the image from the lens 2 upwardly onto a focusing-plate 17 in the top of the box 1, the structure 4 having an opening 18, through which the image can be projected onto said focusing-plate. The mirror 16 is so disposed that the length of the axial ray from the lens 2 to the mirror and thence to the focusing-plate 17 is precisely the same as the length of the axial ray from the lens to the exposed portion of the sensitive plate at the rear end 5 of the structure 4. Hence the focal length of the image formed upon the plate 17 will be precisely the same as that of the image formed upon the exposed portion of the sensitive plate. When the focusing has been completed, the mirror 16 is swung up to the top of the structure 4, so as to close the opening 18 therein and prevent leakage of light into the camera through said opening, and in order to more effectively attain this object the top of the structure 4 may have a depending flange 20, into which the mirror 16 will snugly fit when it has been swung upward. To prevent access of light to the portions of the sensitive film exposed at and near the rolls, the structure 4 may have internal partitions inclosing these portions, as shown at 21, and to prevent the leakage of light onto the exposed portion of the sensitive plate when the mirror 16 is adjusted to the inclined position the structure 4 may have an inwardly-projecting inclined flange 22, against which the mirror abuts when in the inclined position. Except when being used for focusing purposes the focusing-plate 17 will be covered by a cap or slide 23.

Having thus described my invention, I claim and desire to secure by Letters Patent—

1. The combination of a box-camera having a longitudinally-adjustable film or plate carrying structure, with a focusing device having its adjustable element connected directly to and moving with said longitudinally-adjustable film or plate carrying structure of the camera, substantially as specified.

2. A camera having a focusing-plate visible from the outside of the camera, a longitudinally-adjustable film or plate carrying structure, and an adjustable reflector carried by and moving with said structure, and serving to project an image onto the focusing-plate, substantially as specified.

3. A camera having a focusing-plate visible from the outside of the camera, a longitudinally-adjustable roll-film-carrying structure having a portion which shields the rolls from the chamber within said structure, and an adjustable reflector carried by and moving with said structure and serving to project the image onto the focusing-plate, substantially as specified.

In testimony whereof I have signed my name to this specification in the presence of two subscribing witnesses.

JOSEPH D. MORLEY.

Witnesses:
LOUIS W. WORTHING,
JOHN ROURKE.